July 27, 1965
E. H. ZELL ET AL
3,196,545
YARDAGE GAGE FOR GOLF CARTS
Filed July 17, 1961
3 Sheets-Sheet 1
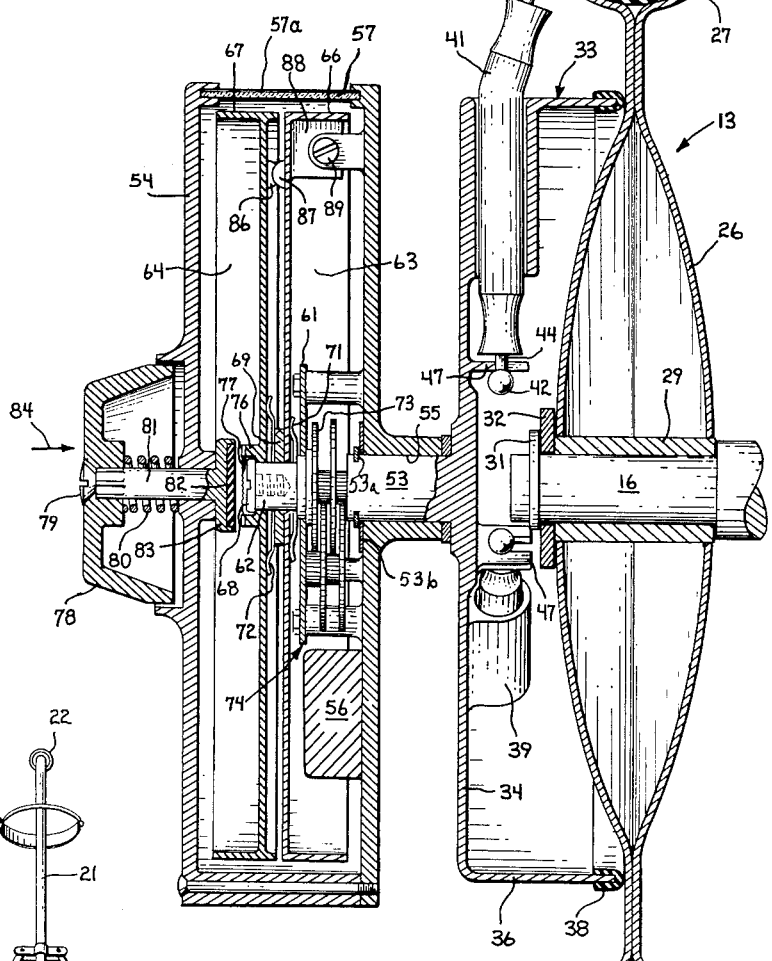
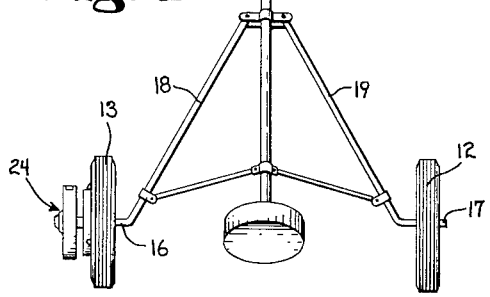
INVENTOR.
EVERTSON H. ZELL and
BY THOMAS W. DUNCAN
Lockwood, Woodard, Smith & Weikart
Attorneys

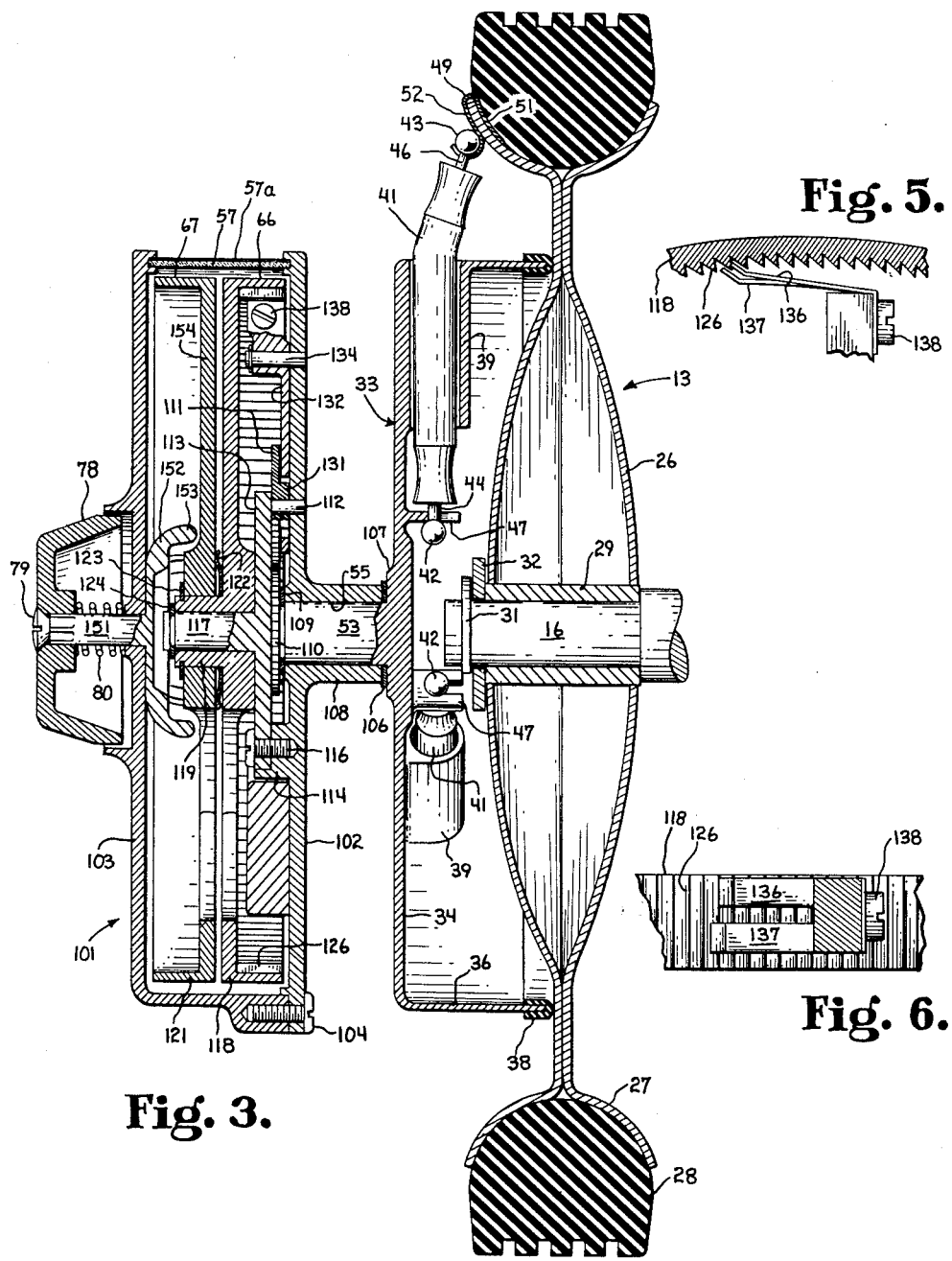

July 27, 1965  E. H. ZELL ET AL  3,196,545
YARDAGE GAGE FOR GOLF CARTS
Filed July 17, 1961  3 Sheets-Sheet 3

INVENTOR.
EVERTSON H. ZELL and
BY THOMAS W. DUNCAN
Lockwood, Woodard, Smith & Weikart
Attorneys

United States Patent Office 3,196,545
Patented July 27, 1965

3,196,545
YARDAGE GAGE FOR GOLF CARTS
Everison H. Zell, 4747 Millersville Road, and Thomas W. Duncan, 4611 Radnor Road, both of Indianapolis, Ind.
Filed July 17, 1961, Ser. No. 124,514
12 Claims. (Cl. 33—141)

This invention relates generally to measuring devices and more particularly to a measuring device for mounting to the road wheel of a golf cart or the like for the purpose of measuring and indicating both the distance traveled from the tee and the distance remaining to the green.

In the game of golf, it is highly important to the success of the player, that he make accurate estimates of the distance to the green from the point where his ball lies. Yet this can be one of the most difficult aspects of the game to the average player, for the reason that there are few buildings or other man made objects of known or easily appraisable size by which a golfer can judge the distance from his position to that of the green. Furthermore, inasmuch as the golf course normally incorporates various irregular features such as sand traps, hills, rough grassy areas, and ponds, it becomes extremely difficult for a person to estimate the distance from where he stands to the green.

The problems involved with the estimation of distance have long been recognized. Various means have been devised whereby a golfer can obtain some estimate of the distance from his position to the green. Included among these devices have been various types of meters which may be mounted to a golf cart or the like. However these have had various disadvantages including, requirement that they be connected both to the wheels of the golf cart and to the frame of the golf cart, failure to record or indicate a change of distance when the golf cart is being moved in other than a usual direction of motion, obscurity of the distance indicating means during most of the motion of the cart, susceptibility to dust and damage by encounters with rough grass and hazards, and ability to indicate only the distance remaining to the green or only the distance traveled from the tee. The inconvenience caused by these various deficiencies is obvious.

It is therefore a general object of this invention to provide a measuring device useful with a revolvable member to measure revolutions thereof.

It is a still further object of this invention to provide a device of the foregoing character in which the number of revolutions or partial revolutions in both directions is non-algebraically summed and the summation thereof is indicated.

It is a still further object of this invention to provide a measuring device capable of being adjusted to indicate not only the number of revolutions made but also the number of revolutions yet to be made before a certain nominal or predetermined number of revolutions has been obtained.

It is a still further object of this invention to provide means of the foregoing character which is readily adapted to mounting to the wheel of a golf cart or the like and which at the location of the ball, indicates yardage from the tee and to the green, and which can readily be dismounted from the golf cart for storage.

It is a still further object of this invention to provide means of the foregoing character wherein each of the yardage indicating scales may be set independently to their proper respective positions before leaving the tee.

It is a still further object of this invention to provide means of the foregoing character which can be readily accommodated to use with golf cart wheels of various sizes, and which need contact or be attached to only the cart wheel and nothing else.

It is a still further object of this invention to provide means of the foregoing character requiring very nominal space.

It is a still further object of this invention to provide means of the foregoing character which are not susceptible to environmental damage such as from dust and rain, whether in storage or during operation, and which are not susceptible to fouling by weeds or high grass during operation.

Related objects, advantages and features of the invention will become apparent as the description proceeds.

In a typical embodiment of this invention there is provided a member particularly suited to mounting the measuring device to a wheel having a rubber tire thereon. This member includes a plurality of radially extending resilient devices which have connectors at their outermost ends which are secured to clips inserted between the tire and the rim of the wheel. It is preferred to provide three such clips spaced approximately 120° apart whereby the mounting member is centered on the axis of the wheel and slightly outboard thereof.

A case or housing is pivotally mounted on the mounting member whereby there may be free relative rotation therebetween. The casing has a weight disposed therein whereby the casing is maintained in an upright position while the mounting member turns with the wheel. A suitable gear drive is normally provided whereby a driven gear rotatably mounted to the case drives a cam which is connected thereto. The cam drives a pawl engaging a ratchet wheel having a yardage indicating scale thereon. A second scale bearing wheel is frictionally engaged with the first scale bearing wheel within the housing. One of these wheels carries markings indicating distance traveled and the other carries markings indicating the distance unplayed from the position of the player to the location of the green.

A suitable knob is provided for resetting the scale bearing wheels upon reaching a new tee for the next hole. An aperture is provided at the top of the casing spanned by a viewing window having a reference line thereon. This aperture and accordingly the viewing window is constantly at the top of the case and easily observable whereby the golfer need not adjust the position of his golf cart or assume an awkward position to read the distance of his position from the green and from the tee.

The full nature of the invention will be understood from the accompanying drawings and the following description and the claims, corresponding parts in various figures of drawing being identified by the same reference numerals.

FIG. 1 is a front elevational view of a golf cart equipped with a yardage gage according to the present invention.

FIG. 2 is a longitudinal section taken along the axle of a golf cart or the like and representing a simplified, prototype form of the present invention.

FIG. 3 is a longitudinal section similar to that of FIG. 2 but representing a typical embodiment of the present invention.

FIGS. 5 and 6 are enlarged fragmentary views showing details of the pawl and ratchet wheel arrangement.

Figure 4:
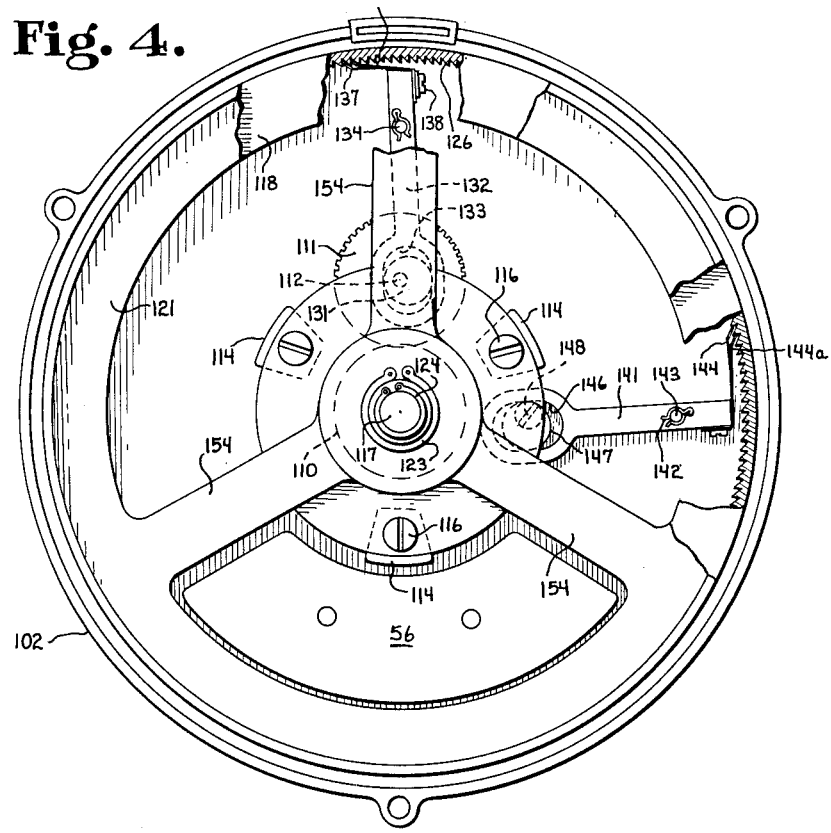
FIG. 4 is a partial cross section of the structure of FIG. 3.

Referring more particularly to FIG. 1 there is shown a golf cart designated generally by reference numeral 11 having a pair of road wheels 12 and 13 mounted to the cart by means of axles 16 and 17 which are securely fastened to the downwardly depending portions 18 and 19 of the frame. The cart has a central member 21 at the upper end of which is the handle 22 by which the cart may be pulled or pushed. The present invention is shown mounted on the wheel 13 and is designated generally by the reference numeral 24.

Referring to FIG. 2 the wheel 13 includes a web portion 26 having a rim 27 at the periphery thereof in which a rubber tire 28 is seated. A bearing sleeve 29 is shown mounted in the wheel to turn on the axle shaft 16 and the wheel is retained to the shaft by means of the snap ring 31 and thrust washer 32.

A mounting member or adapter designated generally by reference numeral 33 is provided. The adapter includes a web portion 34 to which is joined an annular flange portion 36. An annular pad 38 is mounted on the flange at the periphery thereof and the pad serves to avoid damage to the wheel itself.

Radially extending tube-like recesses 39 are disposed on the web 34 of the adapter. These are preferably three in number and spaced at an angular relation of 120° apart. Each of these recesses opens through the exterior wall of the annular flange 36. They are thereby adapted to receive elastic members 41 which may be springs or other suitable elastic material. Each of the elastic means 41 carries at each end thereof a connecting means which, in the illustration, is of the form of a ball 42, 43 mounted on the end of a round post 44, 46 respectively.

An anchor lug 47 is disposed radially inwardly from each of the recesses 39. Each of the lugs 47 has a slot therein to receive the post 44 of the resilient or elastic member 41. To provide for connection of the outer ends of the elastic members, clips 49 are provided. Each of these clips 49 is usually of a compound U-shape whereby a first side 51 of the U is inserted between the tire 28 and the rim 27. The second side 52 of the U then embraces the outside of the rim 27. This side then forms a re-entrant curve to provide the second U and thus form a U-shaped recess for the ball 43 at the outer extremity of the resilient member 41. The clip of course has a slot therein to accommodate the post 46 on the resilient member.

While the construction of the resilient member shown is particularly well suited to the use of a rubber or other elastomeric material, a metallic coil spring may be used and, in this instance, conventional loops at the ends of the springs may be employed in lieu of the ball and posts to provide for connection to the anchor lugs and clips. The clips and lugs could be modified slightly to be particularly well suited to this type of construction if desired. An important feature of the construction of the adapter as described thus far, is the fact that when the outer connectors of the resilient members are disconnected from the clips, they are withdrawn into the recesses 39 and thus provide a neat package for storage, avoiding any dangling appendages.

An adapter shaft 53 is provided on the adapter 33 and by virtue of the novel means of mounting the adapter to the golf cart wheel, the axes of rotation of both the cart wheel and the adapter shaft are substantially in line.

Referring specifically to FIG. 2, the indicating mechanism includes a case or housing 54 having a bore 55 whereby it is journaled on shaft 53 and provided with a low friction bearing. The housing is retained on the shaft 53 by means of snap ring 53a and thrust washer 53b. The shaft 53 is thus easily rotatable within the housing. A weight 56 is mounted to the inside of the housing in order to maintain the housing in an upright condition during rotation of the shaft 53 as the golf cart is being moved along the ground. It is thus possible to maintain the plastic or glass viewing window 57 of the housing in an upright location as shown whereby it is at all times visible to the golfer. A reference position indicating means taking the form of reference line 57a is etched or otherwise positioned on the window 57.

A bearing plate 61 is bolted to the housing 54 and carries a stub shaft 62. The shaft 62 has pivotally mounted thereto a pair of drums 63 and 64 having graduated scales 66 and 67 which may be, for example, embossed, engraved or printed on the annular flanges thereof. These drums are retained to the shaft by means of the screw 68 and there is a spacer 69 between the two drums. A friction coupling of the drums is provided by the friction springs 71 and 72.

An output gear 73 is mounted on the shaft 62 and is driven by the conventional reduction gear train designated generally by reference numeral 74 which is driven initially by the adapter shaft 53. Due to the frictional drive or clutch connection provided for by the friction springs 71 and 72, the output gear 73 is capable of driving the drums 63 and 64 with the indicator scales mounted thereon by virtue of the fact that the housing 54 remains nonrotating while the adapter shaft 53 turns therein.

For purposes of resetting the scales, a boss 76 is provided on the drum 64 and has a serrated or knurled face 77. A setting or resetting knob 78 is mounted by means of the screw 79 to the shaft 81 which is journaled in the housing 54. The knob is mechanically biased outwardly from the housing by spring 80. A pad 82 is disposed on the face of the flange 83 at the inside end of the shaft 81 and provides means whereby the depression of the knob in the direction of arrow 84 permits engagement of the pad with the serrated surface 77 to override the clutch connections between the drums 63 and 64 and the output shaft 62 provided by springs 71 and 72.

Dogs 86 and 87 which are mounted to the drums 64 and 63 respectively, are positioned so that they are capable of interlocking and upon movement of the drum 64 by the knob 78 a sufficient amount, the drum 63 can also be moved, slipping the clutch connection provided by spring 71. Drum 63 carries a lug 88 inside the peripheral flange thereof which is engageable with the adjustable stop screw 89 mounted to the housing whereby the inner drum can be conveniently reset to zero.

In the operation of the device just described, the clips 49 may be driven into position between the tire and the rim. The resilient or elastic members of the adapter can then be attached to the clips and thus support the indicating device itself. It is the relative rotational motion between the adapter shaft 53 and the case 54 which provides the motive means for operating the indicator mechanism. As the golf cart wheel rotates, power is transmitted to the drums 63 and 64 whereby they are rotated in unison and thus their indicating scales move with respect to a reference line in the indicator window 57.

Figure 8:
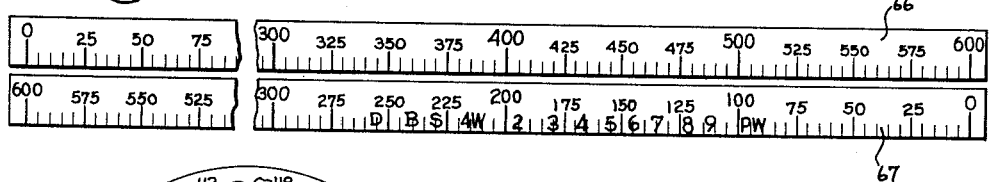
FIG. 8 illustrates a typical arrangement of the yardage scales used in this invention.
Figure 7:
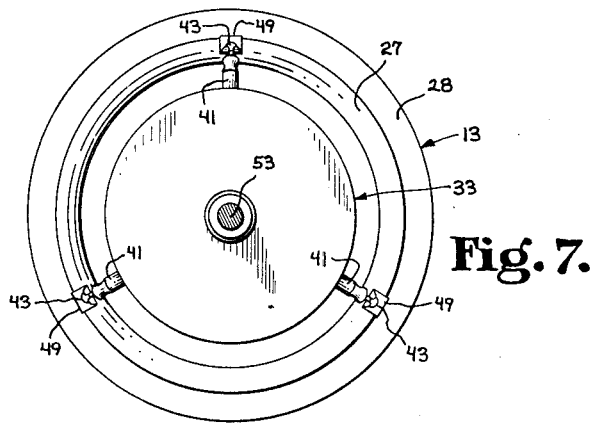
FIG. 7 is a fragmentary view of the mounting member mounted to the wheel of a golf cart, viewed from outboard of the golf cart wheel.

In FIG. 8 it will be observed that the scale 66 reads from zero to 600 yards in 5 yard increments reading from left to right. Scale 67 reads from zero to 600 yards in similar increments but in opposite direction, that is from right to left. Also scale 66 has in addition, at proper intervals, numbers or letters which suggest golf clubs to be used for corresponding distances on the yardage scale. Both of the scales move in the same direction, scale 66 indicating increasing distance (distance traveled) while scale 67 indicates decreasing distance (distance to the green).

To set the scales at a tee area, the knob 78 is pushed inwardly to engage the pad 82 with the serrated boss 76. By turning the knob 78 in the clockwise direction (facing the knob), clockwise rotation of the drum 64 is obtained. Dog 86 on drum 64 engages dog 87 on drum 63, causing the latter drum to rotate with the former drum. This movement is continued until zero on the scale on drum 63 is centered on the reference line in the plastic window 57. At this time the adjustable stop 89 engages the dog 88 on the back of the drum 63 establishing an accurate zero adjustment.

The knob 78 is then turned in a counterclockwise direction slipping the clutch provided by spring 72, the knob being still pressed inwardly for engagement of the pad 82 with the serrations 77. The knob is turned in the counterclockwise direction until a figure on the scale 67 representing the total distance from the tee to the green appears centered under the reference line on the window 57. The spacer 69, being fixed to the shaft 62, which is held stationary by the gear reduction train 74 as long as the golf cart is stationary, enables turning of the drum 64 in the counterclockwise direction without affecting the setting of the drum 63. The device is then ready for use. The structure just described differs from that to be described with reference to FIGS. 3 and 4 in that the rotation of the golf cart wheels registers on scales 66 and 67 only when the wheels rotate in one direction. While it is normal to pull the golf cart behind one, it is sometimes desirable to turn the cart around and let it move ahead of the golfer particularly when walking down a steep grade or hill. The embodiment of the present invention disclosed in FIGS. 3 and 4 permits this more flexible operation.

Referring to FIGS. 3 and 4, in which parts having counterparts in FIG. 2 are given the same reference numerals, the adapter is substantially the same as that shown in FIG. 2. The indicator housing or case 101 is composed of two principal pieces, the inner member 102 and the outer member 103, fastened together by means of the screws 104. The inner member has a bore 55 therein journaled on the shaft 53 to provide a low friction bearing assembly. A thrust washer 106 is disposed between the boss 107 on the adapter 33 and collar 108 of the case. A spring washer or snapring 109 is mounted on the shaft 53 and retains the case in position on the shaft.

A driving gear 110 is mounted to the inner end of the driving shaft 53. A driven gear 111 is journaled on the axle 112 mounted to the case. A gear retainer plate 113 is mounted to the supports 114 evenly spaced around the inside of the inner member 102 of the case. The plate is fastened thereto by means of the screws 116. This plate has a shaft 117 integral therewith which supports a first or inner ratchet wheel or drum 118. The inner drum includes a collar 119 thereon by which it journals the outer drum 121. A friction spring 122 is disposed between the inner and outer drums and the outer drum is retained on the inner drum by means of the spring washer or snapring 123. The inner ratchet wheel is retained on the shaft 117 of the gear retainer plate by means of the spring washer or snapring 124.

The inner drum has internally disposed teeth 126 of a shape which is readily apparent from the illustrations in FIGS. 4, 5 and 6. Yardage indicating scales 66 and 67 are provided on the periphery of the inner and outer drums respectively. A cam 131 is mounted to the inside surface of gear 111 and is thus driven by the gear 110. The cam is preferably made in the form of an eccentric as shown in FIG. 4. A cam follower 132 is provided in the form of a lever having the elongated hole 133 therein. The lever is mounted to a fulcrum or pivot 134 which is mounted on the case. At the top of the lever there is provided a pair of pawls 136 and 137 which are of slightly different length as illustrated in FIG. 5. They may be formed in an integral bifurcated flat spring fastened to the upper end of the lever 132 by means of the screw 138. The pawls provide means whereby the inner drum can be advanced in response to movement of the cam follower 132 by the cam 131. A second lever 141 which may be identical in construction to the follower 132, is mounted to the housing by means of the pivot pin 143, being retained thereon by the hairpin spring clip 142. This lever includes pawls 144, 144a identical to those on the follower 132. An aperture 146 in the lever accommodates an eccentric member 147 fastened to the housing by means of a lock screw 148. The secondary pawls 144, 144a are therefore fixed, but their location is adjustable by means of eccentric 147. A clutch connection is thus provided between the driving shaft 53 and the inner drum 66, the clutch connection being one-way in the sense that rotation of shaft 53 in either direction produces rotation of drum 66 in one direction only.

A viewing window 57 is provided in top of the housing. A resetting knob 78 is fastened to the shaft 151 by means of the screw 79. Shaft 151 includes at its inner end a cup-shaped member 152 having pins 153 at the outer margins thereof, preferably six in number and equally spaced. These pins are effective to engage the spokes 154 of the outer drum 121 when the knob 78 is depressed sufficiently against its return spring 80.

The presetting of this unit is accomplished similarly to the manner in which it is accomplished for the unit described previously. The knob is pressed inwardly for engagement of the pins with the spokes of the outer drum. It is then turned counterclockwise (as viewed in FIG. 4), overriding the clutch connection provided by the pawls and ratchet teeth, until the indicating scale 66 on the inner drum shows its zero marking opposite the reference line on the viewing window 57. The clutch connection provided by friction spring 122 between the drums is of sufficient strength to transmit rotation of the outer drum to the inner drum without the necessity of inter-locking dogs between the drums as was the case in the embodiment of FIG. 2. When the zero reading has been effected for the inner drum, the knob is rotated clockwise until the appropriate yardage distance reading on the scale 67 of the outer drum is aligned with the reference line in the viewing window. The pawl and ratchet arrangement and the slipping of the spring clutch connection 122 between the drums prevents clockwise movement of the inner drum during the setting of the outer drum.

In the operation of this embodiment of the invention, after resetting as described above, the golf cart may be pulled or pushed, that is, the cart wheels may be rotated in either direction, and, in either case, adapter 33 drives the driving gear 110 which in turn drives the driven gear 111. The cam or eccentric 131 turning with the driven gear operates within the opening 133 of the follower 132 causing a rocking motion thereof about the pivot 134. This rocking motion is effective to advance the inner member or drum 118 whereupon the yardage indications are changed on the scale viewed through the viewing window 57 and this advancing motion of the drum occurs unidirectionally independently of the direction of rotation of wheel 13. The outer drum 121 is carried along with the inner drum by virtue of the frictional connection therebetween through the medium of the friction spring 122. The secondary fixed pawls 144, 144a prevent backward rotation of the inner drum 118 as the driving pawls move backward during oscillation of the follower 132.

By virtue of the fact that the fingers or pawls 136 and 137 as well as those of pawl 144, 144a are of unequal length, the drum is enabled to advance at half-tooth increments, by limiting movement of the driving pawl to a distance greater than one-half tooth but less than one full tooth. Friction bearing of the pawls on the inclined faces of the teeth is made great enough to prevent the drum from rotating in response to bumps and jars. The eccentric 147 of the secondary or fixed pawl assembly 144 permits adjustment of this pawl to coordinate its operations with that of the driven pawl.

It should be apparent that movement of the golf cart in either a forward or reverse direction will produce unidirectional rotation of the drums whereby yardage will continuously be measured regardles of whether the cart is pulled or pushed, providing a considerable advantage over the embodiment of FIG. 2. Accordingly, the golfer may pull the cart along behind him over the level terrain, and let the cart descend ahead of him when walking downhill.

The number of teeth in the inner drum 118, together with the unequal length of the pawl members, permits movement of the pawl to register one yard increments on the scale 66 on the inner drum. However as can be observed from FIG. 8, for the purpose of convenience and clarity of presentation, the subdivisions shown on the scales are in five yard increments.

Referring specifically to FIG. 8, scale 67 indicates yardage from the position of the golfer, to the green. Various letters and numbers appear on scale 67 below the yardage indications, from the approximate location of the 260 yard marking toward the zero marking. At 255 yards the marking D is used to indicate that a driver is the appropriate club to use at that distance and greater distances from the green. At the 240 yard marker, a B is placed to indicate that a brassie is the proper club to use at this distance from the green. Similarly, at the 230 yard marker, an S is placed to indicate that a spoon is the proper wood for use at this distance from the cup. Again at the 215 yard marker a 4W is placed indicating that the No. 4 wood is the appropriate one for use at this distance. From the 195 yard marker to the 110 yard marker, various numbers are placed indicating the numerical designation of the iron which is usually most appropriate at these distances from the cup. Between the 100 yard marker and the zero marker the PW marking is placed to indicate that the pitching wedge is the appropriate club for use within 100 yards of the pin.

As a particular example of the use of the device of this invention, assume that the hole to be played is 375 yards from the tee to the pin or cup. The indicating scales on the inner and outer drums are set by pressing knob 78 inwardly and rotating it counterclockwise whereupon the scale 66 on the inner drum is positioned so that the zero thereon is aligned with the reference line on the indicating window 57. Turning the knob clockwise, the indicating scale 67 is positioned so that the 375 yard marking thereon is aligned with the reference line on the window 57. At the completion of the first drive of 220 yards, for example, when the golfer has pulled his golf cart the 220 yards from the tee to the lie of his ball, the scale 66 will read 220 (length of drive), and the lower scale 67 reads 155 (remaining yards to green). Also on the lower half of the scale 67 the number 5 is seen under the reference line. Thus the number 5 iron is suggested for this remaining 155 yard shot.

Should the second shot fail to reach the green, the indicator reading will again indicate on the scale 66 the total yards from the tee achieved by the first and second shots, and scale 67 will indicate the remaining distance to the green. For example, assuming that the second shot moved the ball 90 more yards, when the golfer arrives at the lie of the ball after the second shot, the scale 66 will read 310 yards and scale 67 will read 65 yards. On the lower half of the scale 67 the letters PW are seen, suggesting that the pitching wedge be used for this distance from the green.

From the foregoing description it will be appreciated that this invention provides an invaluable asset to the golfer. It has both great utility and can be used most conveniently. The adapter clips can be driven readily into position between the tire and the rim of the golf cart wheel, no other connection to the golf cart being required. The adapter is in the form of a cup so that contact with the wheel is made only at the rim of the cup, avoiding contact with the axle or hub cap of the golf cart wheel. Thus the adapter can be mounted on either disc or spoke wheels without disfigurement of the wheel caused by screw holes or permanently attached mounting devices which are used in prior art structures.

An additional feature is that the elastic members retract within the mounting adapter when not attached to the clips so that they are protected from mechanical damage during handling and storage and provide for a compact unit. This can be particularly well appreciated when it is realized that most golf carts are made collapsible in form so that they may be readily placed in the trunk of an automobile or other storage receptacle.

An additional feature of this invention which adds immensely to the convenience of the golfer is the fact that because the housing does not rotate while the golf cart wheel rotates, the scale viewing window is always on top and easily visible to the golfer. Moreover the golf cart, in the case of the embodiment of FIGS. 3 and 4, can be either pulled or pushed and the measurements will continue to be made.

All the working parts of the unit are protected from environment such as dust or dirt and entanglement with weeds and other obstructions. The knob 78 is recessed within a collar on the outer member of the housing and cannot become entangled with weeds and the like.

By provision of two scales, one of which registers distance traveled since the last setting and the other indicating the remaining distance to the green, the golfer can both judge his effectiveness accurately and can accurately judge distances for future shots.

The construction of the unit is simple and inexpensive, and certain parts such as the pawl assemblies can be manufactured identically for both the active pawl or the secondary pawl applications. The unit can, of course, be mounted to wheels of motorized golf buggies. Calibration for correct yardage readings with various sizes of wheels can be easily obtained by changing the respective sizes of gears 110 and 111. One need only remove screws 104 and 116 to make the change.

As a variation within the scope of the invention, by which gears 110 and 111 can be eliminated, cam 131 may be mounted directly to shaft 53 rather than to gear 111, at the same time lengthening follower 132, and moving pivot 134 radially inwardly to compensate for the additional length of the follower. However calibration for different sizes of golf cart wheels would have to be effected by providing an adjustment of the follower pivot location, rather than by changing gears as in the illustrated embodiment.

In the interest of economy a further variation of the invention could be effected by eliminating the outer drum 121. In this instance, it would be preferable to place scale 67 on the inner drum 118. Resetting would then be accomplished by a short, counterclockwise turn of knob 84 until the yardage from the tee to the next green appears under the reference line.

Perhaps it should be mentioned that this device need not be limited to the golf cart application inasmuch as its novel features adapt it to many other uses. Just one example would be the measurement of feet of cable removed from a spool.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:
1. A mechanism for measuring played and unplayed distances adapted for attachment to a golf cart wheel comprising: a first element adapted for attachment to the golf cart wheel and rotatable therewith, a drive shaft extending from said first element concentric with the axis of rotation of the wheel, a housing supported on said drive shaft, means for maintaining said housing substantially stationary as said drive shaft rotates, a reference position indicating means carried by said housing, a first member mounted for rotation within said housing and carrying a distance played scale cooperating with said reference position indicating means, a second member mounted for rotation within said housing and carrying an unplayed distance scale cooperating with said reference position indicating means, clutch connection means between said members and said drive shaft to permit rotation of the members in unison by the drive shaft, whereby rotation of the cart wheel is transferred to said members, and manually operable means accessible from the exterior of said housing for overriding said clutch connection means to permit individual orientation of said distance scales with relation to said reference position indicating means.

2. A mechanism for measuring played and unplayed distances adapted for attachment to a golf cart wheel comprising: a first element adapted for attachment to the golf cart wheel and rotatable therewith, a drive shaft affixed to said first element and extending from said first element concentric with the axis of rotation of the wheel, support means journaled on said drive shaft and weighted to prevent rotation of said support means as said drive shaft rotates, said support means being relatively movable with respect to the golf cart, a reference position indicating means affixed to said support means, a first member mounted to said support means for rotational movement with respect to said support means and carrying a distance played scale cooperating with said reference position indicating means, a second member mounted to said support means for rotational movement with respect to said support means and carrying an unplayed distance scale cooperating with said reference position indicating means, clutch connection means between said members and said drive shaft to permit rotation of the members in unison by the drive shaft, whereby rotation of the cart wheel is transferred to said members, and manually operable means for overriding said clutch connection means to permit individual orientation of said distance scales with relation to said reference position indicating means.

3. A mechanism for measuring played and unplayed distances adapted for attachment to a golf cart wheel comprising: a first element adapted for attachment to the golf cart wheel and rotatable therewith, a drive shaft extending from said first element concentric with the axis of rotation of the wheel, a housing supported on said drive shaft, means for maintaining said housing substantially stationary as said drive shaft rotates, a reference position indicating means carried by said housing, a first member mounted for rotation within said housing and carrying a distance played scale cooperating with said reference position indicating means, a second member mounted for rotation within said housing and carrying an unplayed distance scale cooperating with said reference position indicating means, motion transmission means including a clutch connection extending between said drive shaft and said members whereby rotation of the cart wheel is transferred to said members, and manually operable means accessible from the exterior of said housing for overriding said clutch connection between said members and the drive shaft to permit orientation of said distance scales with relation to said reference position indicating means.

4. A mechanism for measuring played and unplayed distances adapted for attachment to a golf cart wheel comprising: a first element adapted for attachment to the golf cart wheel and rotatable therewith, a drive shaft affixed to said first element and extending from said first element concentric with the axis of rotation of the wheel, a housing supported on said drive shaft, means for maintaining said housing substantially stationary as said drive shaft rotates, a reference position indicating means carried by said housing, a first member mounted for rotation within said housing and carrying a distance played scale cooperating with said reference position indicating means, a second member mounted for rotation within said housing and carrying an unplayed distance scale cooperating with said reference position indicating means, a clutch connection between said members to permit unitary rotation thereof, motion transmission means including a one-way clutch connection extending between said drive shaft and one of said members whereby rotation of the cart wheel in either direction is transferred to said members unidirectionally, and manually operable means accessible from the exterior of said housing for overriding the clutch connection between said members and the one-way clutch connection component of said motion transmission means to permit individual orientation of said distance scales with relation to said reference position indicating means, said one-way clutch connection component including a cam coupled to said drive shaft and rotatable thereby with respect to said housing, a follower pivotally mounted to said housing and oscillated by said cam as said drive shaft is rotated in said housing, pawl means mounted to said follower, and ratchet teeth disposed on said one member and abuttingly engageable and movable by said pawl means during a portion of the oscillation of said follower by said cam.

5. A mechanism for measuring played and unplayed distances adapted for attachment to a golf cart wheel comprising: a first element adapted for attachment to the golf cart wheel and rotatable therewith, a drive shaft affixed to said first element and extending from said first element concentric with the axis of rotation of the wheel, support means journaled on said drive shaft and weighted to prevent rotation of said support means as said drive shaft rotates, said support means being relatively movable with respect to the golf cart, a reference position indicating means affixed to said support means, a first member mounted to said support means for rotational movement with respect to said support means and carrying a distance played scale cooperating with said reference position indicating means, a second member mounted to said support means for rotational movement with respect to said support means and carrying an unplayed distance scale cooperating with said reference position indicating means, a clutch connection between said members to permit unitary rotation thereof, motion transmission means including a one-way clutch connection extending between said drive shaft and one of said members whereby rotation of the cart wheel in either direction is transferred to said members undirectionally, and manually operable means accessible from the exterior of said housing for overriding the clutch connection between said members and the one-way clutch connection component of said motion transmission means to permit individual orientation of said distance scales with relation to said reference position indicating means, said one-way clutch connection component including a cam coupled to said drive shaft and rotatable thereby with respect to said support means, a follower pivotally mounted to said support means and oscillated by said cam as said drive shaft is rotated in said support means, pawl means mounted to said follower, and ratchet teeth disposed on said one member and abuttingly engageable and movable by said pawl means during a portion of the oscillation of said follower by said cam.

6. A measuring device for use with a revolvable member and comprising: a mounting member for attachment to the revolvable member for revolution therewith, said mounting member including a body portion and a plurality of resilient means connected to said body portion and to said revolvable member thereby fastening said mounting member to said revolvable member; a frame rotatably mounted to said mounting member; means on said frame whereby said frame remains non-revolving as said mounting member revolves; a cam driven by said mounting members; at least one pawl driven by said cam; and a ratchet wheel driven by said pawl and moving measurement indicating means carried jointly by the frame and the ratchet wheel.

7. The device of claim 6 wherein said body portion has an outer margin and includes receptacles extending radially inwardly from said outer margin, with said resilient means partially enclosed therein when said mounting member is fastened to said revolvable member and wherein said resilient means are substantially enclosed in said receptacles upon unfastening said mounting member from said revolvable member.

8. A measuring and indicating device for use with a revolvable wheel having a rim with a tire mounted thereon, said device comprising: a mounting member for attachment to the wheel; a case journaled to said mounting member and having means thereon whereby said case remains upright as said mounting member revolves; a driving gear on said mounting member inside said case; a driven gear engaged with said driving gear and rotatably mounted to said case; a cam driven by said driven gear; a follower pivotally mounted to said case and having at least one pawl driver thereby; and a ratchet wheel driven by said pawl and having a measurement indicating scale thereon.

9. A yardage measuring and indicating device for use with a golf cart or the like having at least one road wheel including a rim with a tire thereon, said device comprising: a mounting member for attachment to the road wheel; a case journaled to said mounting member and having a center of mass below the journal axis whereby said case remains upright as said mounting member revolves; a driving gear on said mounting member inside said case; a driven gear engaged with said driving gear and rotatably mounted to said case; a cam driven by said driven gear; a follower pivotally mounted to said case and having at least one pawl driven thereby; a ratchet wheel driven by said pawl and having a yardage indicating scale thereon; and means operatively associated with said ratchet wheel for setting said indicating scale.

10. A yardage measuring and indicating device for use with a golf cart or the like having at least one road wheel including a rim with a tire thereon, said device comprising: a mounting member including clips driven between the tire and the rim, a central body portion, and resilient means radially extending between said body portion and the rim and connected thereto, attaching said mounting member to the wheel; a case journaled to said mounting member and having a center of mass below the journal axis whereby said case remains upright as said mounting member revolves; a driving gear on said mounting member inside said case; a driven gear engaged with said driving gear and rotatably mounted to said case; a cam driven by said driven gear; a follower pivotally mounted to said case and having at least one pawl driven thereby; a ratchet wheel driven by said pawl and having a yardage indicating scale thereon having graduations designating increasing yardage as the ratchet wheel is driven by the pawl; a drum having a second yardage indicating scale thereon, said drum being frictionally engaged by said ratchet wheel and driven thereby, said second scale having graduations designating decreasing yardage as the ratchet wheel is driven by the pawl; a scale viewing aperture at the top of said case; and setting means engageable with said drum for setting said indicating scales.

11. An apparatus for mounting a measuring device to a revolvable wheel having a rim-like portion and comprising: clips for attachment to the rim-like portion; a body portion; radially extending receptacles on said body portion; anchor means on said body portion and associated with said receptacles; resilient means having connectors at opposite ends thereof, said resilient means being disposed principally in said radially extending receptacles with one connector of each engaging one of said anchor means and the outer end connector of each engaging one of said clips to fasten the apparatus to the wheel, said outer end connector of said resilient means being retractable into said body portion upon disengagement from said clips.

12. An apparatus for mounting a measuring device to a revolvable wheel having a tire bearing rim and comprising: clips for insertion between the tire and rim and having a generally U-shaped receptacle therein with a slot in said receptacle; a body portion having a web and an annular flange; an annular pad at a margin of said flange for engaging a portion of the wheel; radially extending receptacles on said body portion and opening through said annular flange; anchor lugs on said body portion disposed radially inwardly from said receptacles on said body portion; generally elongated resilient means having connectors at opposite ends thereof, said resilient means being disposed principally in said radially extending receptacles with one connector of each engaging one of said anchor lugs and the outer end connector of each engaging one of said clips to fasten the apparatus to the wheel, said outer end connector of said resilient means being retractable into said body portion upon disengagement from said clips.

References Cited by the Examiner

UNITED STATES PATENTS

| | | | |
|---|---|---|---|
| 11,878 | 10/54 | Thompson | 235—95.2 |
| 1,026,070 | 5/12 | Boomhower et al. | 235—95.3 |
| 1,807,163 | 5/31 | Mills | 235—95.2 |
| 2,043,162 | 6/36 | Foster | 33—215.3 |
| 2,655,314 | 10/53 | Hutsell | 235—95 |
| 2,711,027 | 6/55 | Williamson | 33—141 |
| 2,780,939 | 2/57 | Kellogg | 73—458 |

ISAAC LISANN, *Primary Examiner.*

LOUIS PRINCE, *Examiner.*